(12) United States Patent
Grunau et al.

(10) Patent No.: US 8,449,188 B2
(45) Date of Patent: May 28, 2013

(54) ROUND TABLE BEARING

(75) Inventors: Arbogast Grunau, Weisendorf (DE); Juergen Hilbinger, Neustadt/Aisch (DE); Reinhard Schwinghammer, Tuchenbach (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 816 days.

(21) Appl. No.: 12/600,575

(22) PCT Filed: May 13, 2008

(86) PCT No.: PCT/EP2008/055816
§ 371 (c)(1),
(2), (4) Date: Dec. 2, 2009

(87) PCT Pub. No.: WO2008/141969
PCT Pub. Date: Nov. 27, 2008

(65) Prior Publication Data
US 2010/0150493 A1    Jun. 17, 2010

(30) Foreign Application Priority Data
May 18, 2007   (DE) .......................... 10 2007 023 242

(51) Int. Cl.
*F16C 21/00*   (2006.01)
*F16C 27/00*   (2006.01)

(52) U.S. Cl.
USPC ............................................. 384/99; 384/101

(58) Field of Classification Search
USPC ...................................... 384/99, 101, 549, 581
See application file for complete search history.

(56) References Cited

U.S. PATENT DOCUMENTS

| | | | | |
|---|---|---|---|---|
| 2,631,901 A | * | 3/1953 | Holben et al. | 384/99 |
| 3,784,267 A | * | 1/1974 | Davis | 384/453 |
| 4,764,033 A | * | 8/1988 | Kohring et al. | 384/99 |
| 5,281,029 A | * | 1/1994 | Morita | 384/8 |
| 7,018,102 B1 | * | 3/2006 | Brotz | 384/99 |

FOREIGN PATENT DOCUMENTS

| | | |
|---|---|---|
| DE | 42 23 256 A | 1/1994 |
| DE | 42 27 366 A | 2/1994 |
| DE | 101 51 263 A | 4/2003 |
| EP | 0 673 709 A | 9/1995 |

* cited by examiner

*Primary Examiner* — Phillip A Johnson
(74) *Attorney, Agent, or Firm* — Lucas & Mercanti, LLP

(57) ABSTRACT

A round table bearing, which has a radial, axial roller bearing for mounting a first bearing ring part relative to a second bearing ring part, and a squeeze-film damper which is connected parallel to the radial, axial bearing. The squeeze-film damper has a basic damper component which is coaxial to the bearing ring parts and which is fastened, together with a rolling element of the bearing ring part which contacts the radial, axial roller bearing, to a rotary table base part.

14 Claims, 3 Drawing Sheets

ROUND TABLE BEARING

This application is a 371 of PCT/EP2008/055816 filed May 13, 2008, which in turn claims the priority of DE 10 2007 023 242.1 filed May 18, 2007, the priority of both applications is hereby claimed and both applications are incorporated by reference herein.

FIELD OF THE INVENTION

The invention relates to a rotary table bearing which has a radial-axial rolling bearing and a squeeze film damper.

BACKGROUND OF THE INVENTION

A rotary table bearing of the type specified in the introduction is known, for example, from DE 101 51 263 A1. Said rotary table bearing has in each case one gap, which is filled with damping liquid, between mutually facing end sides of rolling body cages and counterpart race ring parts. The rolling body cages are therefore simultaneously parts of the damping device, which utilizes the squeeze effect. Here, the cage thickness corresponds approximately to the diameter of the rollers used as rolling bodies.

OBJECT OF THE INVENTION

The object on which the invention is based is that of specifying a rotary table bearing which is suitable for a machine tool and which is characterized both by a high rigidity and also by a compact, easy to assemble design.

SUMMARY OF THE INVENTION

Said object is achieved according to the invention by means of a rotary table bearing having the features of claim 1. Said rotary table bearing has bearing and damping devices which are connected in parallel with regard to their action, specifically a radial-axial rolling bearing, which comprises two race ring parts which are rotatable relative to one another, and a squeeze film damper. A ring-shaped or ring-segment-shaped damper base component, which is concentric with respect to the race ring parts, of the squeeze film damper is fastened to a non-rotatable rotary table base component, with one and the same fastening device serving both to fasten the damper base component and also to fasten one of the race ring parts to the rotary table base part. The fastening device may comprise cohesive, positively locking or non-positively locking connections.

It is preferable for a plurality of fastening screws to be inserted in each case through the damper base component and through the race ring part on which the rolling bodies of the radial-axial rolling bearing roll and to be fixedly screwed to the rotary table base part. Each of said fastening screws preferably extends in the axial direction of the rotary table bearing and is arranged radially between the rolling bodies of the radial-axial rolling bearing and the damping gap of the squeeze film damper. In an embodiment which is particularly advantageous in particular with regard to ease of assembly and with regard to the precision which can be obtained, the first race ring part, which is fixed with respect to the frame, and the damper base component bear on a single planar surface of the rotary table base part. Here, in a space-saving arrangement, the squeeze film damper and the radial-axial rolling bearing take up the same axial installation space, with the squeeze film damper preferably being arranged radially outside the radial-axial rolling bearing.

The damping gap preferably extends substantially in the radial direction, and in the simplest case, has a rectangular cross-section. In contrast to this, a V-shape, U-shape or other curved shape of the damping gap is also conceivable. By means of said non-linear shapes of the damping gap, it is possible in a simple manner to obtain a damping action both in the axial direction and also in the radial direction. In any case, the squeeze film damper damps axial and tilting oscillations of the rotary table in a particularly effective manner.

Regardless of the precise shape of the damping gap, which is arranged in annular fashion around the rotational axis of the rotary table bearing, the edges of said damping gap are preferably sealed off by means of encircling seals. In addition or as an alternative to sealing rings, it is possible for losses of the damping fluid to be minimized by selecting suitable damping fluids, in particular oils, and/or by means of surface treatment, in particular coatings, of the components which delimit the damping gap. The cross-sectional shape of the damping gap already has a significant influence on the leakage rate which occurs during the operation of the squeeze film damper. It is for example possible for channels in the surfaces adjoining the damping gap to contribute to the retention of the fluid used for vibration damping. At the same time, such channels enlarge the surfaces which are wetted by the damping fluid, and thereby improve the damping action in particular in the case of small gap widths.

The width, which need not necessarily be uniform, of the damping gap is preferably at least 20 μm and at most 500 μm. According to one advantageous refinement, the gap width of the squeeze film damper is variable. In said case, it is possible to provide maximum gap widths of up to 10 mm, which is virtually equivalent to a deactivation of the squeeze film damper, for example for the operation of the rotary table at high rotational speeds and/or with low mechanical load.

Regardless of whether the gap width of the squeeze film damper is constant or variable, said gap width may be filled with an electrorheological or magnetorheological liquid as a damping fluid. Such a liquid enables, in a simple manner, a very fast variation of the damping properties within a very wide scope, if required. The damping fluid may be supplied to the damping gap, for example, by means of an internal pump which is integrated into the rotary table bearing, by means of an external pump or by means of gravity. In order to compensate different filling quantities of the squeeze film damper, which are dependent, for example, on thermally induced dimensional changes or targeted variable adjustments of the damping gap width may be provided, an internal compensating tank for the damping fluid. The exchange of the damping fluid filling of the damping gap may take place, for example, as a function of automatically measured properties of the damping fluid, or in a timed manner. To reliably prevent overloading of the squeeze film damper including the fluid supply, at least one overpressure non-return valve may be integrated into the damping device, for example, into a line between the damping gap and a compensating tank.

In one preferred embodiment, an overlap region between the first race ring part, which is fastened to the rotary table base part, and the damper base component is provided both in the axial direction and also in the radial direction. An abutment of the first race ring part against the damper base component is provided in both directions, such that the first race ring part is fixed relative to the damper base component in the radial direction and also at least in one axial direction. The overlap region between the first race ring part and the damper base component is preferably narrower in the radial direction of the radial-axial rolling bearing than a raceway which is formed by the first race ring part and on which the rolling bodies, which serve for radial mounting, roll. In one preferred embodiment, the height, measured in the axial direction, of the overlap region corresponds to the thickness, measured in the same direction, of the first race ring part. The first race ring part is therefore neither reinforced nor narrowed in the overlap region. The height, measured in the axial direction of the radial-axial rolling bearing and corresponding to the thickness of the first race ring part which is fastened to the rotary table base part, of the overlap region preferably amounts to at least half of the height, likewise measured in the axial direction of the rotary table bearing, of the damper base component.

The substantially rectangular cross-section of the first race ring part, which is fixed with respect to the frame, also has in the radial direction a maximum dimension which is preferably smaller than the maximum dimension, measured in the same direction, of the cross section of the damper base component. The radial extent of the cross section of the first race ring part preferably amounts to at least 30% and at most 70% of the corresponding dimension of the cross section of the damper base component. The extent, measured in the radial direction of the rolling bearing, of the damping gap is preferably greater than the length of the rolling bodies, which are embodied as rollers and serve for axial mounting, of the radial-axial rolling bearing. The damping gap of the squeeze film damper is delimited on one side by the damper base component or a part which is connected thereto and on the other side by the second race ring part or a component which is connected thereto.

The advantage of the invention is in particular that, by means of a defined abutment of the race ring part, which is fixed with respect to the frame, against the damper base component and a fastening of said parts to the rotary table frame by means of common fastening elements, it is possible to obtain a high degree of mechanical precision with simple assembly.

A plurality of exemplary embodiments of the invention will be explained in more detail below on the basis of a drawing, in which:

BRIEF DESCRIPTION OF THE DRAWING

Corresponding or functionally equivalent parts are denoted by the same reference symbols in all the figures.

DETAILED DESCRIPTION OF THE DRAWING

Figure 1:
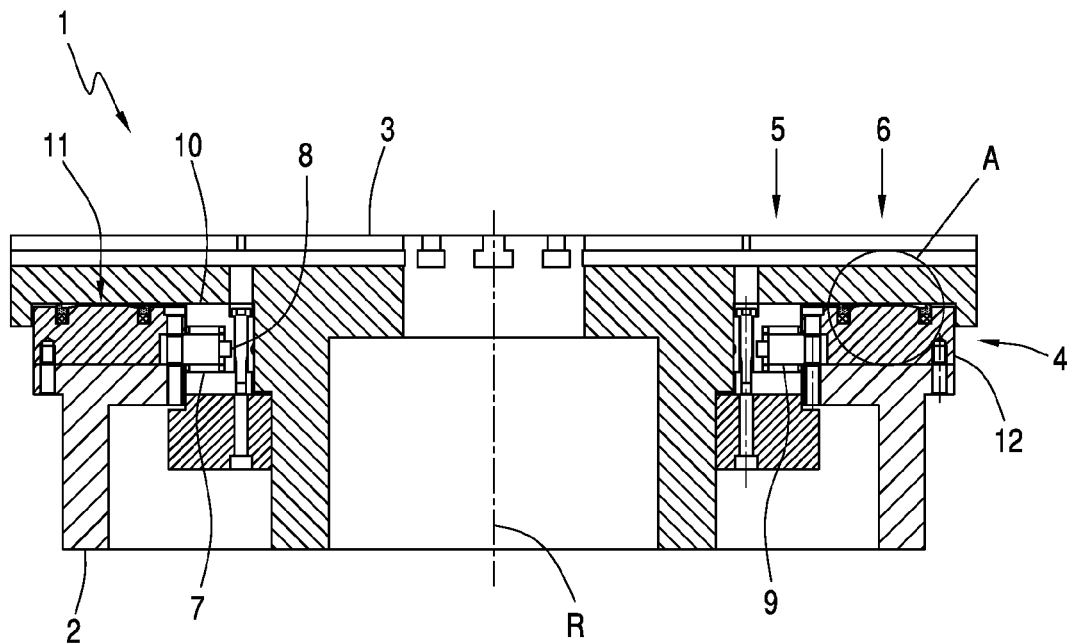
FIG. 1 shows a sectional illustration of a rotary table bearing having a rolling bearing arrangement and squeeze film damping.
Figure 2:
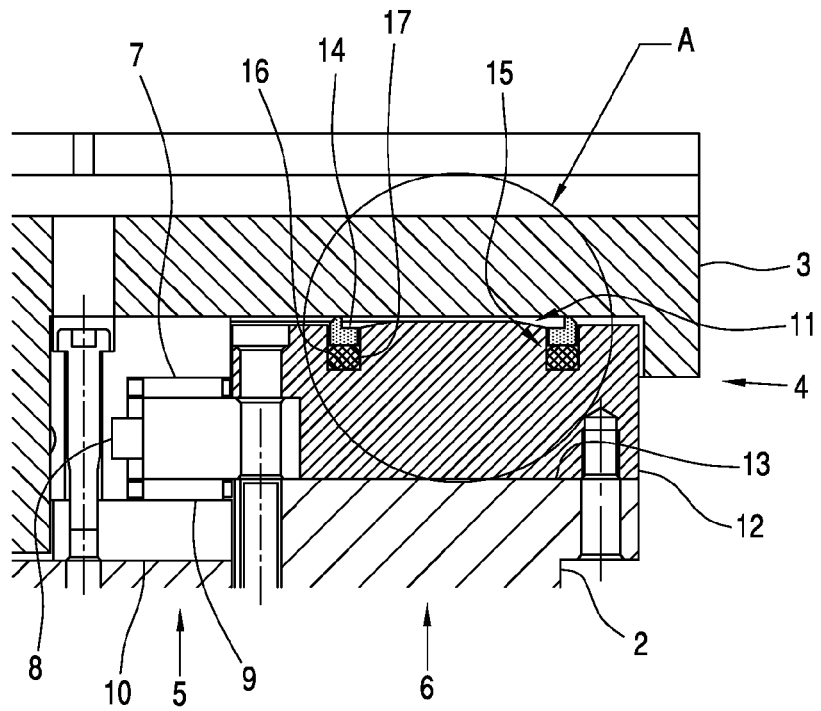
FIGS. 2-6 show, in enlarged sectional illustrations, in each case one bearing and damping device suitable for the rotary table bearing according to FIG. 1.
Figure 3:
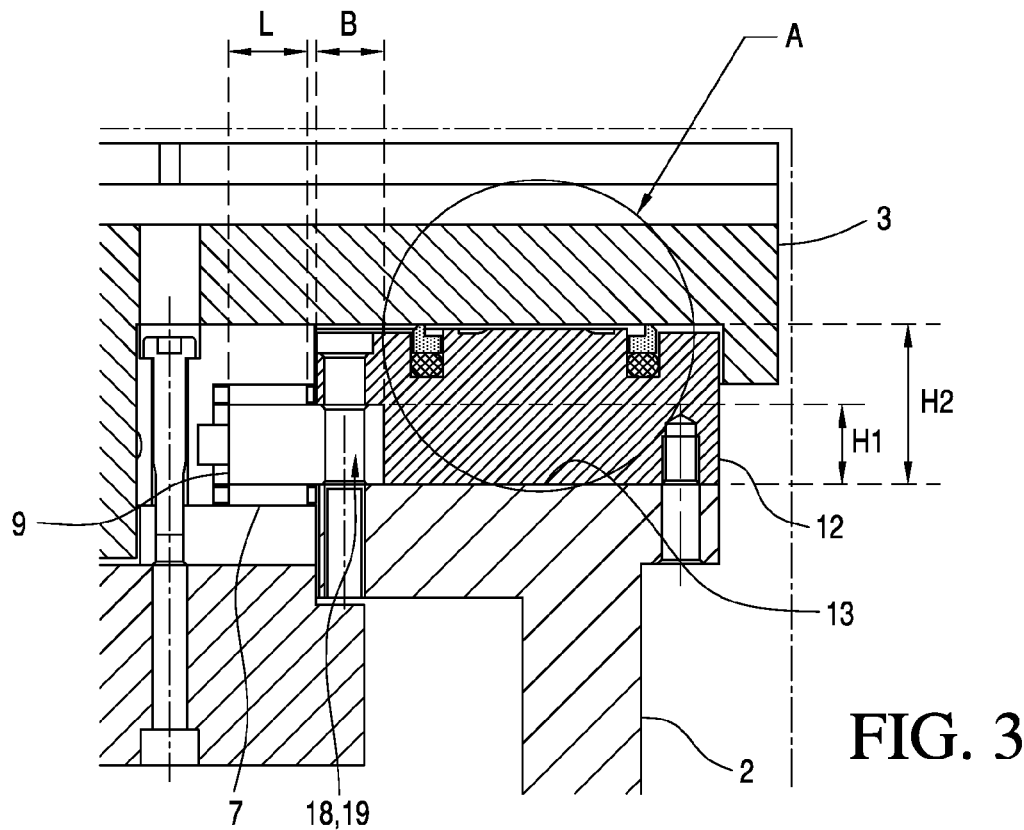
Figure 4:
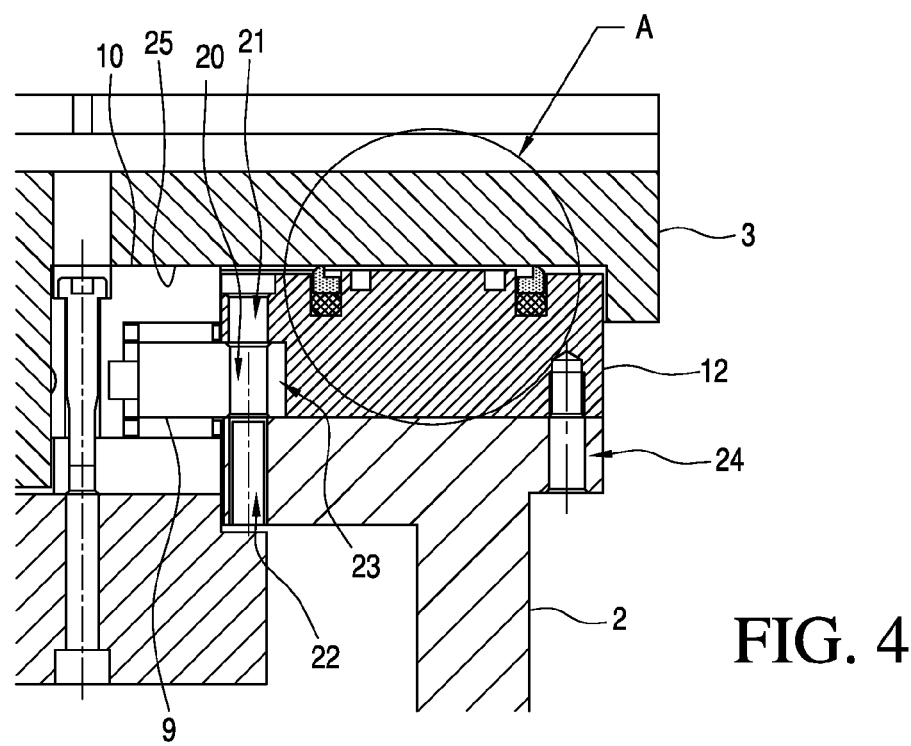

FIG. 1 shows, in a simplified illustration, a rotary table 1 of a machine tool (not illustrated in any more detail) which is suitable in particular for drilling, turning and milling, having a rotary table base part 2 and having a rotating plate 3 which is rotatably mounted on said rotary table base part 2. For low-friction, rigid and simultaneously damped mounting of the rotating plate 3, a rotary table bearing 4 is provided which comprises a radial-axial rolling bearing 5 and a squeeze film damper 6. The radial-axial rolling bearing 5 is embodied as a cylindrical-roller bearing and comprises two rows of rolling bodies 7 which serve for axial mounting, and one row of rolling bodies 8 which serve for radial mounting. The radial-axial rolling bearing 5 is compatible with so-called YRT bearings, such as are known for example from the catalogue "Wälzlager" ["Rolling bearings"] from Schaeffler K G, January 2006, pages 989 to 1009. The rolling bodies 7, 8, specifically cylindrical rollers, roll on the surface of a first race ring part 9 and simultaneously make contact with a second race ring part 10 which is formed in two parts and which engages in a U-shaped manner around the first race ring part 9, with the first race ring part 9 being fixedly connected to the rotary table base part 2 and the second race ring part 10 being fixedly connected to the rotating plate 3. The latter race ring part 10 is also referred to as the counterpart race ring part.

The squeeze film damper 6 is connected in parallel with the radial-axial rolling bearing 5 with regard to its action and has a gap 11 which is filled with a fluid, in particular oil. To be able to vary the damping action of the squeeze film damper 6, the width of the gap 11 may be variable, in a way which is not shown in the simplified illustration.

Figure 5:
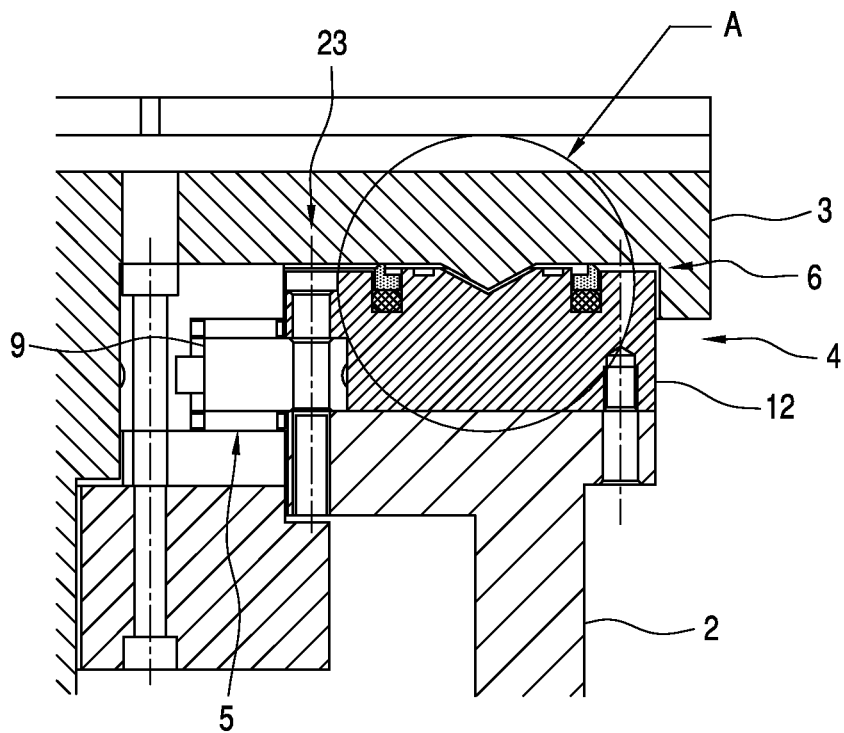
Figure 6:
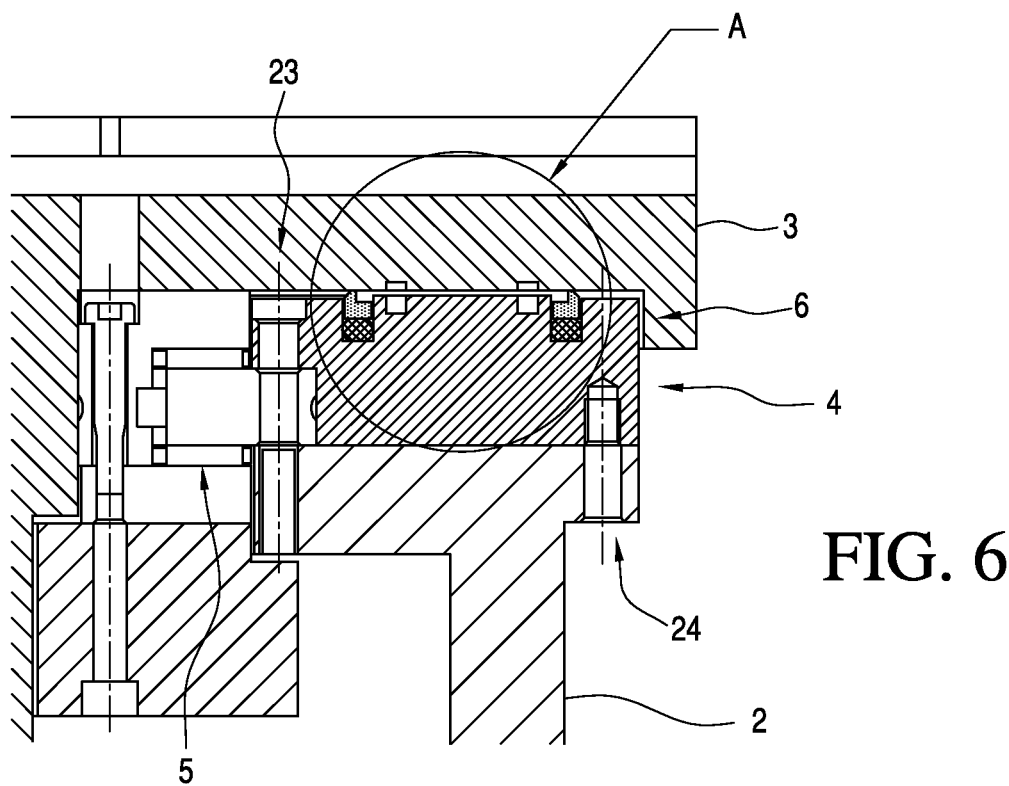

Different embodiments of the squeeze film damper 6 (see detail A) illustrated in FIGS. 2 to 6 differ primarily in terms of the shape of the damping gap 11, with the latter having substantially a rectangular, elongate cross-section which runs in the radial direction, with the exception of the exemplary embodiment according to FIG. 5, which shows a V-shaped gap cross-section. In each embodiment, a damper base component 12, which annularly surrounds the radial-axial rolling bearing 5, of the squeeze film damper 6 is fastened to a planar surface 13, which is normal to the rotary table axis R, of the rotary table base part 2, with the damper base component 12 directly adjoining the damping gap 11. The radially inner edge and the radially outer edge of the damping gap 11 are sealed off by means of one seal 14 each which is situated in a groove 15 in the damper base component 12. Furthermore, a ring 17 composed of an elastic material is arranged in the groove 14 axially between the seal 14 and the groove base 16.

The damper base component 12 has, on its radially inner side facing toward the rotary table base part 2, an annularly encircling step 18 into which the first race ring part 9 engages so as to form an overlap region 19. The width, measured in the radial direction, of the overlap region 19 in which the first race ring part 9 bears on the surface 13 is denoted by B, and the height, measured in the axial direction, of the overlap region 19 is denoted by H1, with the height H1 corresponding to the thickness of the first race ring part 9.

A through bore 20 is situated in that part of the first race ring part 9 which projects into the overlap region 19, which through bore 20 is aligned with a through bore 21 in the damper base component 12 and with a threaded bore 22 in the rotary table base part 2. The damper base component 12 is fastened together with the first race ring part 9 to the rotary table base part 2 by means of a screw connection 23. A further screw connection 24 between the damper base component 12 and the rotary table base part 2 is situated in the radially outer region of the damper base component 12. The entire squeeze film damper 6 is arranged radially outside the radial-axial rolling bearing 5 and takes up the same axial installation space in relation to the axis R.

The height H2, measured in the axial direction, of the damper base component 12 amounts to approximately double the height H1 of the first race ring part 9. That part of the second, rotating race ring part 10 which faces away from the rotary table base part 2 bears against a surface 25, arranged normally with respect to the axis R, of the rotating plate 3, with said surface 25 delimiting the damping gap 11 in a region situated radially further outward.

The rolling bodies 7 which serve for axial mounting, which make contact with the first race ring part 9 and which are embodied as cylindrical rollers have a length which is denoted by L and which is greater than the width B, measured in the direction of extent of the rolling bodies 7, that is to say in the radial direction of the rotary table bearing 4, of the overlap region 19. The overlap region 19 is therefore no wider than is required for the common, stable fastening of the damper base component 12 and of the first race ring part 9 to the rotary table base part 2. Overall, the bearing-damper unit which comprises the radial-axial rolling bearing 5 and the squeeze film damper 6 and which is of compact design is very highly suitable for integration into existing rotary table designs.

LIST OF REFERENCE SYMBOLS

1 Rotary table
2 Rotary table base part
3 Rotating plate
4 Rotary table bearing
5 Radial-axial bearing
6 Squeeze film damper
7 Rolling bodies
8 Rolling bodies
9 Race ring part
10 Race ring part
11 Damping gap
12 Damper base component
13 Surface
14 Seal
15 Groove
16 Groove base
17 Ring
18 Step
19 Overlap region
20 Through bore
21 Through bore
22 Threaded bore
23 Screw connection
24 Screw connection
25 Surface
B Width of the overlap region
H1 Height of the first race ring part
H2 Height of the damper base component
L Length of the rolling bodies which serve for axial mounting
R Rotary table axis

The invention claimed is:

1. A rotary table bearing, comprising:
a radial-axial rolling bearing for mounting a first race ring part relative to a second race ring part; and
a squeeze film damper which is connected in parallel with the radial-axial rolling bearing,
wherein the squeeze film damper has a damper base component which is coaxial with respect to the first race ring part and the second race ring part and which is fastened together with the first race ring part, which makes contact with rolling bodies of the radial-axial rolling bearing, to a rotary table base part, and
wherein the squeeze film damper includes a damping gap disposed at an axial end of the damper base component.

2. The rotary table bearing of claim 1, wherein the damping gap of the squeeze film damper has a rectangular cross-section.

3. The rotary table bearing of claim 1, wherein the damping gap of the squeeze film damper has a V-shaped cross-section.

4. The rotary table bearing of claim 1, wherein the damping gap is sealed off by means of seals arranged in the damper base component.

5. The rotary table bearing of claim 1, wherein the squeeze film damper has a gap width of at least 20 μm.

6. The rotary table bearing of claim 1, wherein the squeeze film damper has a gap width of at most 500 μm.

7. The rotary table bearing of claim 1, wherein the squeeze film damper is filled with an electrorheological or magnetorheological liquid.

8. The rotary table bearing of claim 1, wherein a screw connection, which extends through the damper base component and through the first race ring part, fastens the damper base component and the first race ring part to the rotary table base part.

9. The rotary table bearing of claim 1, wherein the damper base component and the first race ring part bear on a single planar surface of the rotary table base part.

10. The rotary table bearing of claim 1, wherein the first race ring part engages into an annularly encircling step of the damper base component so as to form an overlap region.

11. The rotary table bearing of claim 10, wherein the overlap region between the first race ring part and the damper base component is narrower in a radial direction of the radial-axial rolling bearing than a raceway on which the rolling bodies, which serve for radial mounting, roll.

12. The rotary table bearing of claim 10, wherein a height, measured in an axial direction of the radial-axial roiling bearing, of the overlap region amounts to at least haft of a height, measured in a same direction, of the damper base component.

13. The rotary table bearing of claim 1, wherein the squeeze film damper is arranged radially outside the radial-axial rolling bearing.

14. The rotary table bearing of claim 1, wherein the squeeze film damper and the radial-axial rolling bearing take up a same axial installation space.

* * * * *

UNITED STATES PATENT AND TRADEMARK OFFICE
CERTIFICATE OF CORRECTION

PATENT NO.      : 8,449,188 B2
APPLICATION NO. : 12/600575
DATED           : May 28, 2013
INVENTOR(S)     : Grunau et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 831 days.

Signed and Sealed this
Eighth Day of September, 2015

Michelle K. Lee
*Director of the United States Patent and Trademark Office*